United States Patent
Kawazoe

(10) Patent No.: US 8,794,180 B2
(45) Date of Patent: Aug. 5, 2014

(54) EJECTION DEVICE AND DROPLET DISPOSITION METHOD

(75) Inventor: Kenji Kawazoe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 597 days.

(21) Appl. No.: 13/143,497

(22) PCT Filed: Oct. 9, 2009

(86) PCT No.: PCT/JP2009/067603
§ 371 (c)(1),
(2), (4) Date: Jul. 20, 2011

(87) PCT Pub. No.: WO2010/079645
PCT Pub. Date: Jul. 15, 2010

(65) Prior Publication Data
US 2011/0274848 A1    Nov. 10, 2011

(30) Foreign Application Priority Data
Jan. 6, 2009   (JP) ................. 2009-001050

(51) Int. Cl.
| | |
|---|---|
| B05C 11/00 | (2006.01) |
| B05D 1/02 | (2006.01) |
| B05D 1/00 | (2006.01) |
| B05B 1/14 | (2006.01) |
| B05B 1/00 | (2006.01) |
| G02F 1/1339 | (2006.01) |

(52) U.S. Cl.
CPC ........ *G02F 1/13394* (2013.01); *G02F 1/13392* (2013.01); *G02F 1/1339* (2013.01)
USPC ................ 118/696; 427/427.3; 427/427.2; 427/424

(58) Field of Classification Search
None
See application file for complete search history.

(56) References Cited

U.S. PATENT DOCUMENTS

| | | | |
|---|---|---|---|
| 6,184,954 B1 * | 2/2001 | Inoue et al. | 349/86 |
| 6,285,435 B1 * | 9/2001 | Inoue et al. | 349/189 |
| 2003/0223030 A1 * | 12/2003 | Byun et al. | 349/187 |
| 2005/0117107 A1 * | 6/2005 | Choo et al. | 349/153 |
| 2005/0248715 A1 * | 11/2005 | Byun et al. | 349/187 |
| 2008/0049182 A1 * | 2/2008 | Kawabe et al. | 349/156 |

(Continued)

FOREIGN PATENT DOCUMENTS

| | | |
|---|---|---|
| JP | 11-24083 A | 1/1999 |
| JP | 2007-271740 A1 | 10/2007 |

(Continued)

*Primary Examiner* — Dah-Wei D Yuan
*Assistant Examiner* — Jethro Pence
(74) *Attorney, Agent, or Firm* — Birch, Stewart, Kolasch & Birch, LLP

(57) ABSTRACT

An ejection device in which a multi-nozzle mechanism including failure nozzles ejects droplets such that variation in amounts of droplets (spacers) is prevented and droplets are disposed on spacer regions of a substrate. An ejection device includes a multi-nozzle mechanism including a pair of nozzle row units prepared by equally dividing a nozzle row including a plurality of nozzles ejecting a spacer dispersion liquid, a moving mechanism relatively moving the multi-nozzle mechanism and a substrate in the longitudinal direction and the align direction of spacer regions, and a control mechanism controlling the nozzles and the moving mechanism. When one nozzle row unit includes a failure nozzle, the control mechanism gives a command to the failure nozzle not to eject the liquid and a command to a corresponding nozzle of the other unit to halve cycles of forward and backward paths.

4 Claims, 6 Drawing Sheets

(56) References Cited

U.S. PATENT DOCUMENTS

| | | | |
|---|---|---|---|
| 2008/0204645 A1* | 8/2008 | Kawabe et al. | 349/123 |
| 2009/0033859 A1* | 2/2009 | Ueda et al. | 349/155 |
| 2009/0101064 A1* | 4/2009 | Naka et al. | 118/313 |
| 2009/0304916 A1* | 12/2009 | Nakajima et al. | 427/140 |
| 2009/0309905 A1* | 12/2009 | Yoshioka et al. | 347/8 |
| 2010/0087945 A1* | 4/2010 | Nakajima et al. | 700/105 |

FOREIGN PATENT DOCUMENTS

| | | | |
|---|---|---|---|
| JP | 2008-180872 A | 8/2008 | |
| JP | 4814215 B1 * | 11/2011 | G02F 1/1339 |
| WO | WO 2006/087776 A1 | 8/2006 | |

* cited by examiner

EJECTION DEVICE AND DROPLET DISPOSITION METHOD

TECHNICAL FIELD

The present invention relates to an ejection device that ejects a liquid containing spacers and other ingredients and disposes droplets on given positions of a TFT substrate, and a droplet disposition method.

BACKGROUND ART

There is known a liquid crystal display device that has a liquid crystal display panel in which liquid crystals are filled between a thin film transistor (TFT) substrate and a color filter (CF) substrate. In this type of liquid crystal display panel, spacers made from spherical resin fine particles are interposed between the TFT substrate and the CF substrate in order to save a gap (cell gap) in which liquid crystals are enclosed.

It is necessary to interpose the spacers between the TFT substrate and the CF substrate in order that image display may not be hindered and the cell gap may be uniform. To be specific, the spacers should be interposed along grid pattern black matrix regions on the CF substrate.

In order to interpose the spacers as described above, it is necessary to dispose the spacers in the black matrix regions of the CF substrate in advance or to dispose the spacers on positions of the TFT substrate that correspond to the black matrix regions (e.g., gate lines). The width of the black matrix regions is extremely small and is about several tens of microns. It is therefore desired that the spacers be disposed accurately.

In order to dispose the spacers on the given positions of the CF substrate, an inkjet device is conventionally used. Droplets in which the spacers are dispersed are ejected from nozzles of the inkjet device, and the droplets are disposed on given positions of the substrate. An organic solvent in the droplets disposed on the substrate disappears by volatilization, and only the spacers are left on the substrate.

There is known an inkjet device that uses an inkjet head that has a plurality of nozzles (multi-nozzle head) (see Patent Literature 1). The use of such an inkjet head allows for disposing a plurality of droplets on the substrate by one time of ejection, which results in improved production efficiency.

CITATION LIST

Patent Literature

Patent Literature 1: JP H11-24083A

SUMMARY OF INVENTION

Solution to Problem

In the inkjet head having the plurality of nozzles (multi-nozzle head), there may be cases where failure occurs in only some of the nozzles. For example, some of the nozzles are clogged so that the droplets cannot be ejected therefrom, or some of the nozzles are clogged so that ejection of the droplets is deviated (so-called side deviation occurs). If the failure nozzles having such malfunctions are used with no change, the droplets cannot be disposed on given positions of the substrate, and display irregularity occurs in the liquid crystal display panel, which is a problem. FIG. 7 is a view schematically showing a liquid crystal display panel 20' that includes a TFT substrate 2' on which spacers 6 are disposed with the use of a multi-nozzle head that includes a failure nozzle. As shown in FIG. 7, the liquid crystal display panel 20' includes a CF substrate 2 and the TFT substrate 2' that are opposed to each other. For the purpose of illustration, FIG. 7 shows only the main construction of the liquid crystal display panel 20'.

Essentially, the spacers 6 are to be disposed between gate lines 21' of the TFT substrate 2' and black matrix regions 21 of the CF substrate 2 in order that a cell gap may be uniform. However, if the spacers 6 are ejected from the failure nozzle and are disposed not on the gate line 21' of the TFT substrate 2' but on a pixel electrode 8' as shown in FIG. 7, the gap provided by the spacers 6 become non-uniform, which is a problem. In addition, if the spacers 6 are present on the pixel electrode 8', the spacers 6 hinder transmission of light, which may cause degradation of display quality, which is a problem.

Accordingly, if the failure nozzle is present, it is desirable to remove the multi-nozzle head from the inkjet device and repair the failure nozzle preferably by ultrasonic cleaning.

However, this type of multi-nozzle head is positioned with especially high accuracy in order that a plurality of droplets may be disposed on given positions of the substrate at once. Therefore, much time and effort are required to reset the multi-nozzle head after the multi-nozzle head is once removed, which is a problem.

In the multi-nozzle head, the amounts of droplets ejected from the nozzles are different, and there may occur variation in the amounts of spacers disposed on the substrate. When the plurality of nozzles eject the droplets while being translationally moved, the substrate includes positions on which much spacers are disposed and positions on which less spacers are disposed, which could make the cell gap non-uniform, which is a problem.

An object of the present invention is to overcome the problems described above and to provide an ejection device in which even if a multi-nozzle mechanism includes some failure nozzles, droplets are ejected with the use of the multi-nozzle mechanism such that variation in the amounts of droplets (the amounts of spacers) is prevented and the droplets are disposed on spacer regions of the substrate.

Another object of the present invention is to provide a droplet disposition method of disposing droplets on spacer regions of a substrate with the use of a multi-nozzle mechanism including some failure nozzles while preventing variation in the amounts of droplets (the amounts of spacers).

Solution to Problem

Preferred embodiments of the present invention provide an ejection device that ejects a spacer dispersion liquid prepared by dispersing spacers in a solvent, and disposes droplets of the spacer dispersion liquid on spacer regions of a substrate, the ejection device including a multi-nozzle mechanism that comprises a pair of nozzle row units prepared by equally dividing a nozzle row that comprises a plurality of nozzles that are aligned so as to face different spacer regions and are arranged to eject the spacer dispersion liquid, a moving mechanism arranged to relatively move the multi-nozzle mechanism and the substrate in a longitudinal direction of the spacer regions so that the nozzles are translationally moved along the spacer regions and relatively move the multi-nozzle mechanism and the substrate in an align direction of the spacer regions so that the spacer regions that face the nozzles are changed, and a control mechanism arranged to give a command to the moving mechanism to move the multi-nozzle mechanism in the align direction by a length of the nozzle row unit each time the multi-nozzle mechanism turns around when performing forward and backward movements in the longitudinal direction, in a forward path, give a command to the nozzles to eject the spacer dispersion liquid in a cycle such that the droplets are disposed at given intervals on the spacer regions, and in a backward path, give a command to the nozzles to eject the spacer dispersion liquid in a cycle that is the same as the cycle in the forward path so that the droplets are disposed between adjacent droplets that are disposed on the spacer regions in the forward path, wherein when one of the pair of nozzle row units includes a failure nozzle, the control mechanism gives a command to the failure nozzle not to eject the spacer dispersion liquid, and gives a command to a nozzle in the other nozzle row unit in a position that corresponds to a position of the failure nozzle to halve the cycle in the forward path and the cycle in the backward path.

It is preferable in the ejection device that the substrate includes a TFT substrate, and the spacer regions include gate lines.

It is preferable in the ejection device that the substrate includes a CF substrate, and the spacer regions include black matrix regions.

Preferred embodiments of the present invention also provide a droplet disposition method for disposing droplets of a spacer dispersion liquid prepared by dispersing spacers in a solvent on spacer regions on a substrate with the use of an ejection device comprising a pair of multi-nozzle mechanisms prepared by equally dividing a nozzle row comprising a plurality of nozzles that are aligned so as to face different spacer regions and are arranged to eject the spacer dispersion liquid, the method including a forward path step of relatively moving the multi-nozzle mechanism and the substrate in a longitudinal direction of the spacer regions so that the nozzles are translationally moved along the spacer regions and ejecting the spacer dispersion liquid from the nozzles in a cycle such that the droplets are disposed at given intervals on the spacer regions, a backward path step of relatively moving the multi-nozzle mechanism and the substrate in the longitudinal direction of the spacer regions so that the nozzles are translationally moved along the spacer regions and ejecting the spacer dispersion liquid from the nozzles in a cycle that is the same as the cycle in the forward path so that the droplets are disposed between adjacent droplets that are disposed on the spacer regions in the forward path, and an align direction moving step of relatively moving the multi-nozzle mechanism in the align direction by a length of the nozzle row unit so that the spacer regions that face the nozzles are changed each time the multi-nozzle mechanism turns around, wherein when one of the pair of nozzle row units includes a failure nozzle, the spacer dispersion liquid is not ejected from the failure nozzle in the forward path step and in the backward path step, and the spacer dispersion liquid is ejected from a nozzle in the other nozzle row unit in a position that corresponds to a position of the failure nozzle at a cycle that is half the cycle in the forward path and the cycle in the backward path.

It is preferable in the droplet disposition method that the substrate includes a TFT substrate, and the spacer regions include gate lines.

It is preferable in the droplet disposition method that the substrate includes a CF substrate, and the spacer regions include black matrix regions.

Advantageous Effects of Invention

Even if the ejection device according to the present invention includes some failure nozzles, stopping the use of only the failure nozzle prevents variation in the amounts of the spacers disposed on the spacer regions of the substrate, which allows for continued use of the multi-nozzle mechanism.

Even if the multi-nozzle mechanism including some failure nozzles is used, the droplet disposition method according to the present invention prevents variation in the amounts of the spacers disposed on the spacer regions of the substrate.

DESCRIPTION OF EMBODIMENTS

A detailed description of the present invention will now be provided with reference to the accompanying drawings.

Figure 1:
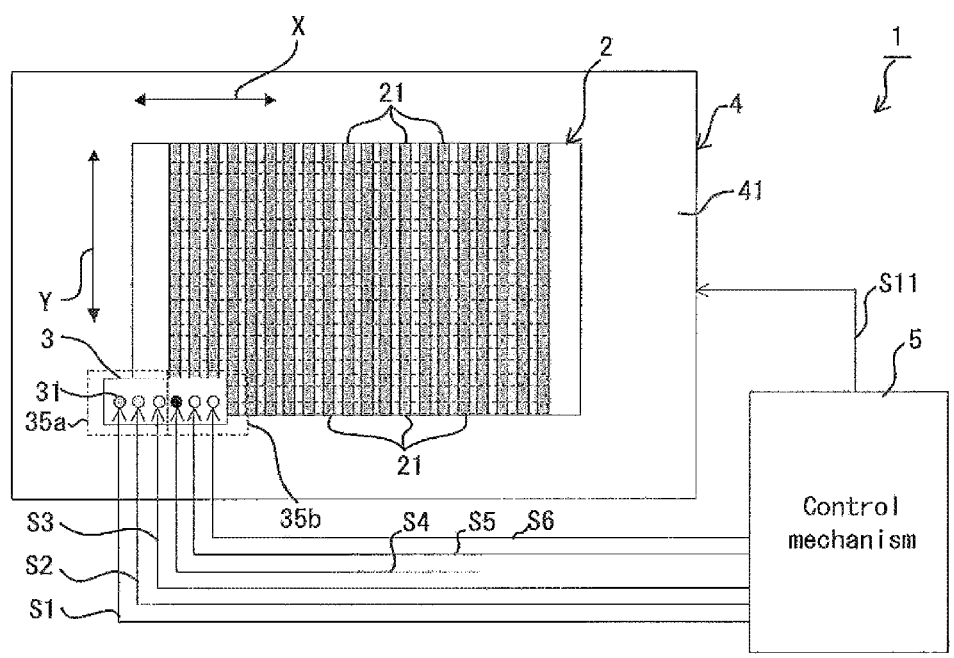
FIG. 1 is an illustrative drawing that shows a configuration of an ejection device.

FIG. 1 is an illustrative drawing that shows a configuration of an ejection device 1. The ejection device 1 is a device that ejects a spacer dispersion liquid prepared by dispersing spacers made from spherical resin particles in an organic solvent. Spacers (spacer beads) according to the present preferred embodiment of the present invention are made from divinylbenzene polymer, and the size of the spacers is 2.7 to 3.2 µm. For the organic solvent, isopropyl alcohol or ethylene glycol is preferably used.

As shown in FIG. 1, the ejection device 1 includes a multi-nozzle mechanism 3, a moving mechanism 4 arranged to move a substrate 2 placed thereon, and a control mechanism 5.

In the present preferred embodiment of the present invention, the substrate 2 is defined by a CF substrate. On the substrate (CF substrate) 2, grid pattern black matrix regions are provided. In the present preferred embodiment of the present invention, among the grid pattern black matrix regions, the spacers are disposed on a plurality of black matrix regions 21 that are arranged in parallel along one direction. Herein, regions on which the spacers are to be disposed such as the black matrix regions 21 are especially referred to as spacer regions. In the present preferred embodiment of the present invention, the spacer regions 21 are arranged parallel to one another at substantially equal intervals on the substrate 2.

When the CF substrate is laid on a TFT substrate, the black matrix regions (spacers regions 21) of the CF substrate are opposed to gate lines on the TFT substrate.

In the present preferred embodiment of the present invention, the CF substrate is used as the substrate 2. However, a TFT substrate 2' may be used as the substrate 2 in another preferred embodiment of the present invention. When the TFT substrate 2' is used as the substrate 2, the spacers are disposed on the gate lines. In this case, the gate lines define spacer regions 21'.

Figure 2A:
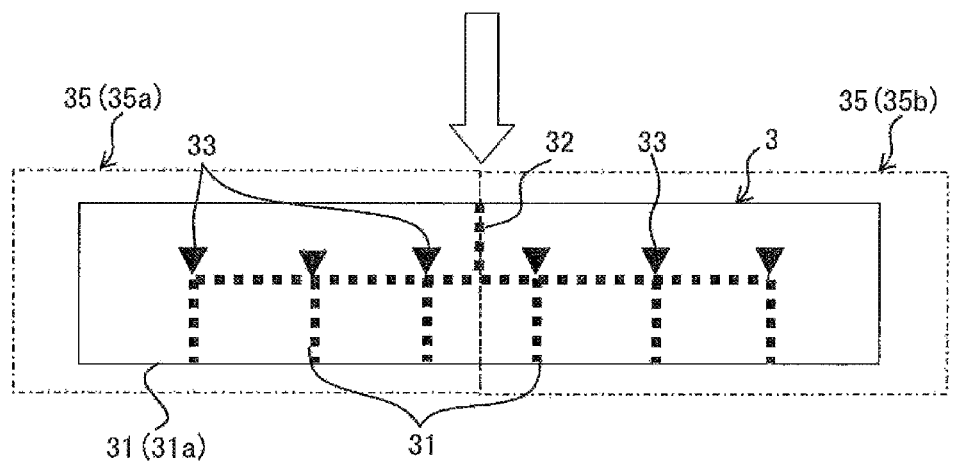
FIG. 2A is a side view of a multi-nozzle mechanism.
Figure 2B:
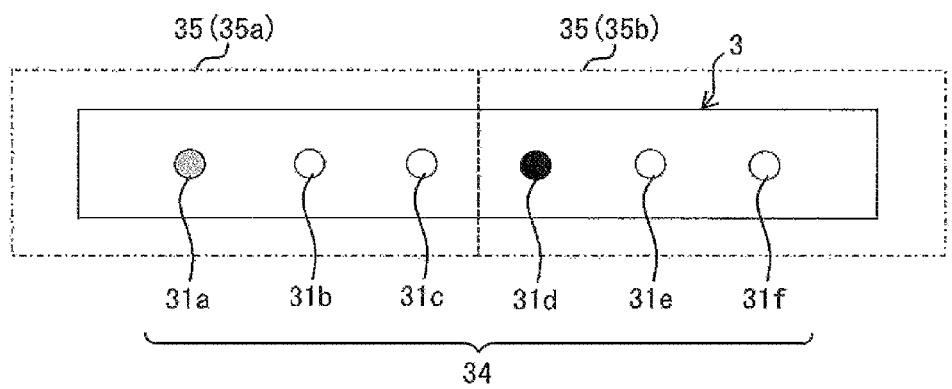
FIG. 2B is a plan view of the multi-nozzle mechanism.

FIGS. 2A and 2B are illustrative drawings that show a configuration of the multi-nozzle mechanism 3. FIG. 2A is a side view of the multi-nozzle mechanism 3, and FIG. 2B is a plan view of the multi-nozzle mechanism 3. As shown in FIGS. 1, 2A, and 2B, the multi-nozzle mechanism 3 includes a plurality of nozzles 31 that eject the spacer dispersion liquid. In the present preferred embodiment of the present invention, six nozzles 31 (31a, 31b, 31c, 31d, 31e, 31f) are included. These nozzles 31 communicate with a common spacer dispersion liquid supply channel 32. The spacer dispersion liquid that has been carried from a supply tank not shown (the arrow in FIG. 2A) passes through the spacer dispersion liquid supply channel 32 to be ejected from the nozzles 31.

Actuators 33 arranged to adjust an ejection time and an ejection amount are provided between the nozzles 31 and the spacer dispersion liquid supply channel 32. The actuators 33 each include piezoelectric elements (not shown). The piezoelectric elements change in shape in order that the spacer dispersion liquid may be ejected in accordance with the degree of an applied voltage or in order that the spacer dispersion liquid may not be ejected.

The nozzles 31 are aligned in a row at substantially equal intervals. The intervals between the nozzles 31 correspond to the intervals between the spacer regions 21 on the substrate 2. In other words, the intervals between the nozzles 31 are set such that the nozzles 31 face different spacer regions 21 when the multi-nozzle mechanism 3 is placed above the substrate 2.

Herein, a row of the nozzles 31 that are aligned in a row is referred to as a nozzle row 34. The multi-nozzle mechanism 3 includes a pair of nozzle row units 35 (35a, 35b) that are divided so as to halve the nozzle row 34. In the present preferred embodiment of the present invention, each of the nozzle row units 35 includes three nozzles 31.

As shown in FIG. 1, the multi-nozzle mechanism 3 is placed above the substrate 2 such that the nozzles 31 face different spacer regions 21 (black matrix regions). In the present preferred embodiment of the present invention, the multi-nozzle mechanism 3 is placed such that the row direction of the nozzle row 34 is parallel to the align direction of the spacer regions 21 (the arrow X direction in FIG. 1). In other words, the multi-nozzle mechanism 3 is placed such that the nozzle row 34 is vertical to the longitudinal direction of the spacer regions 21 (the arrow Y direction in FIG. 1).

In another preferred embodiment of the present invention, the multi-nozzle mechanism 3 may be placed above the substrate 2 such that the nozzle row 34 is inclined with respect to the align direction (or the longitudinal direction). Also in this case, the multi-nozzle mechanism 3 is placed above the substrate 2 such that the nozzles 31 face different spacer regions 21.

The moving mechanism 4 includes a support 41 on which the substrate 2 is placed. The support 41 may be moved by a driving mechanism not shown in the align direction (X direction) and the longitudinal direction (Y direction) of the substrate 2 with the substrate 2 placed thereon.

When the moving mechanism 4 is moved in the longitudinal direction (Y direction), the nozzles 31 of the multi-nozzle mechanism 3 that is placed above the substrate 2 are translationally moved along the spacer regions 21 on the substrate 2.

When the moving mechanism 4 is moved in the align direction (X direction), the spacer regions 21 which the nozzles 31 of the multi-nozzle mechanism 3 that is placed above the substrate 2 face are changed.

In the preferred embodiment of the present invention, the movements of the moving mechanism 4 on which the substrate 2 is placed in the X direction and in the Y direction as described above may relatively move the multi-nozzle mechanism 3 with respect to the substrate 2 on the moving mechanism 4. In another preferred embodiment of the present invention, the multi-nozzle mechanism 3 may be moved above the substrate 2 with the use of a given driving mechanism.

The control mechanism 5 is defined by a microprocessor such as a CPU. As shown in FIG. 1, the control mechanism 5 and the nozzles 31 of the multi-nozzle mechanism 3 (the actuators 33) are electrically connected by signal lines S1, S2, S3, S4, S5, and S6, and the control mechanism 5 and the moving mechanism 4 are electrically connected by a signal line S11.

The control mechanism 5 gives a move command (longitudinal direction move command) to the moving mechanism 4 to translationally move the nozzles 31 of the multi-nozzle mechanism 3 along the longitudinal direction above the spacer regions 21 of the substrate 2.

After the movement of the multi-nozzle mechanism 3 in the longitudinal direction and before a subsequent reverse movement of the multi-nozzle mechanism 3 in the longitudinal direction, the control mechanism 5 gives a move command to the moving mechanism 4 to displace the multi-nozzle mechanism 3 in the align direction (X direction) by a length of the nozzle row unit 35 (an align direction move command).

In the forward path, the control mechanism 5 gives a command to the nozzles 31 of the multi-nozzle mechanism 3 (the actuators 33 of the nozzles 31) to eject the spacer dispersion liquid at a cycle such that droplets are disposed at given intervals (e.g., equal intervals) on the spacer regions (a forward path ejection command).

In the backward path, the control mechanism 5 gives a command to the nozzles 31 of the multi-nozzle mechanism 3 (the actuators 33 of the nozzles 31) to eject the spacer dispersion liquid at the same cycle as the cycle in the forward path so that droplets are disposed between adjacent droplets that are disposed on the spacer regions in the forward path (a backward path ejection command).

When one of the pair of nozzle row units 35 includes a failure nozzle, the control mechanism 5 gives a command to the failure nozzle not to eject the spacer dispersion liquid (an ejection stop command). In such a case, the control mechanism 5 gives a command to a nozzle of the other nozzle row unit that corresponds to the position of the failure nozzle to halve the cycle in the forward path and the cycle in the backward path (a cycle change command).

A description of the relation between the failure nozzle of one nozzle row unit and the corresponding nozzle of the other nozzle row unit is provided referring to FIGS. 1 and 2B. Among a pair of right and left nozzle row units 35a and 35b in FIGS. 1 and 2B, if the right nozzle row unit 35b includes a failure nozzle 31d at the left end, a left end nozzle 31a of the left nozzle row unit 35a is a nozzle that corresponds to the position of the failure nozzle 31d (a corresponding nozzle). In this case, an ejection stop command is transmitted from the control mechanism 5 to the failure nozzle 31d through the signal line S4, and a cycle change command is transmitted from the control mechanism 5 to the corresponding nozzle 31a through the signal line S1.

Figure 3:
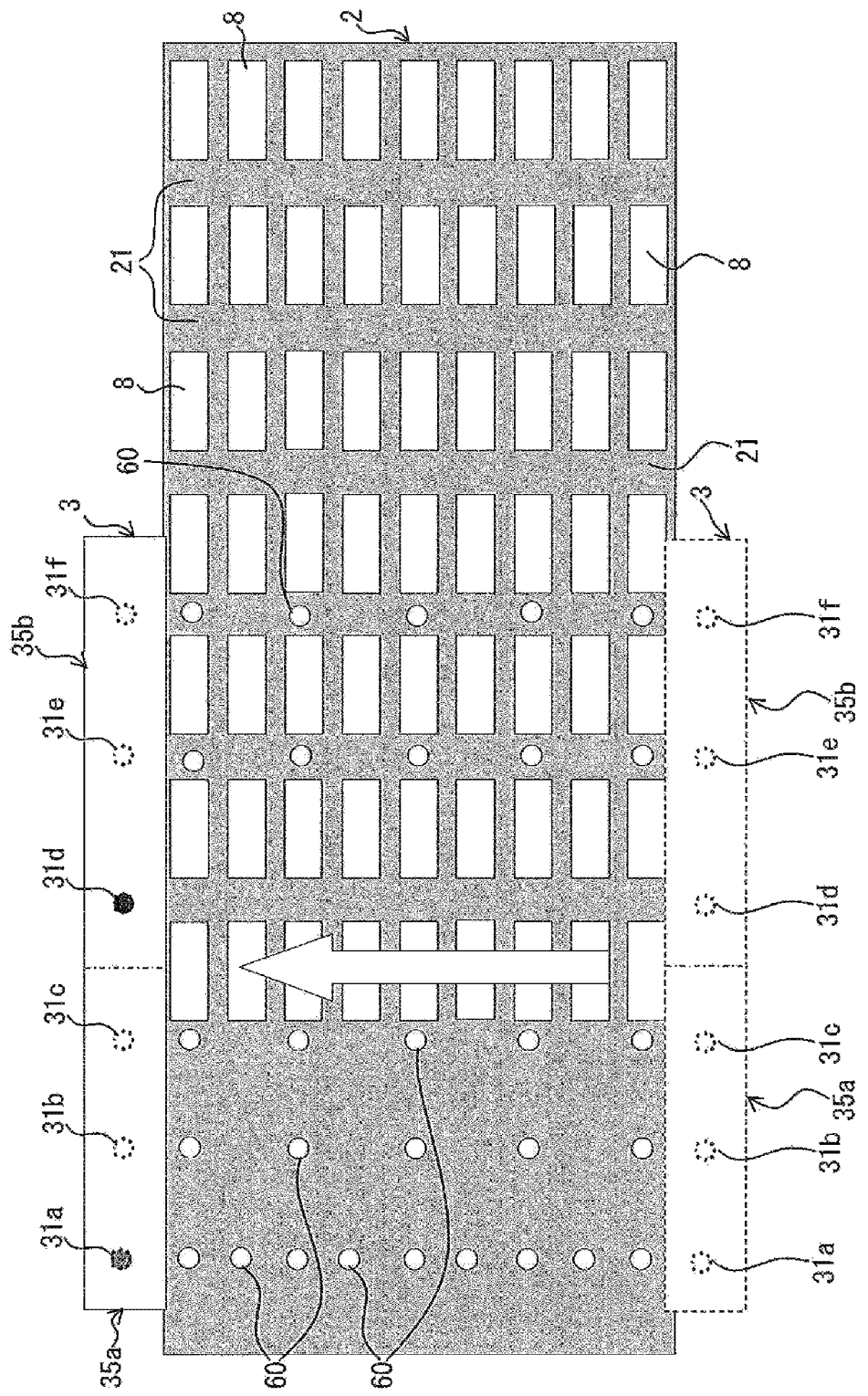
FIG. 3 is an illustrative drawing that shows a forward path step of the multi-nozzle mechanism.
Figure 4:
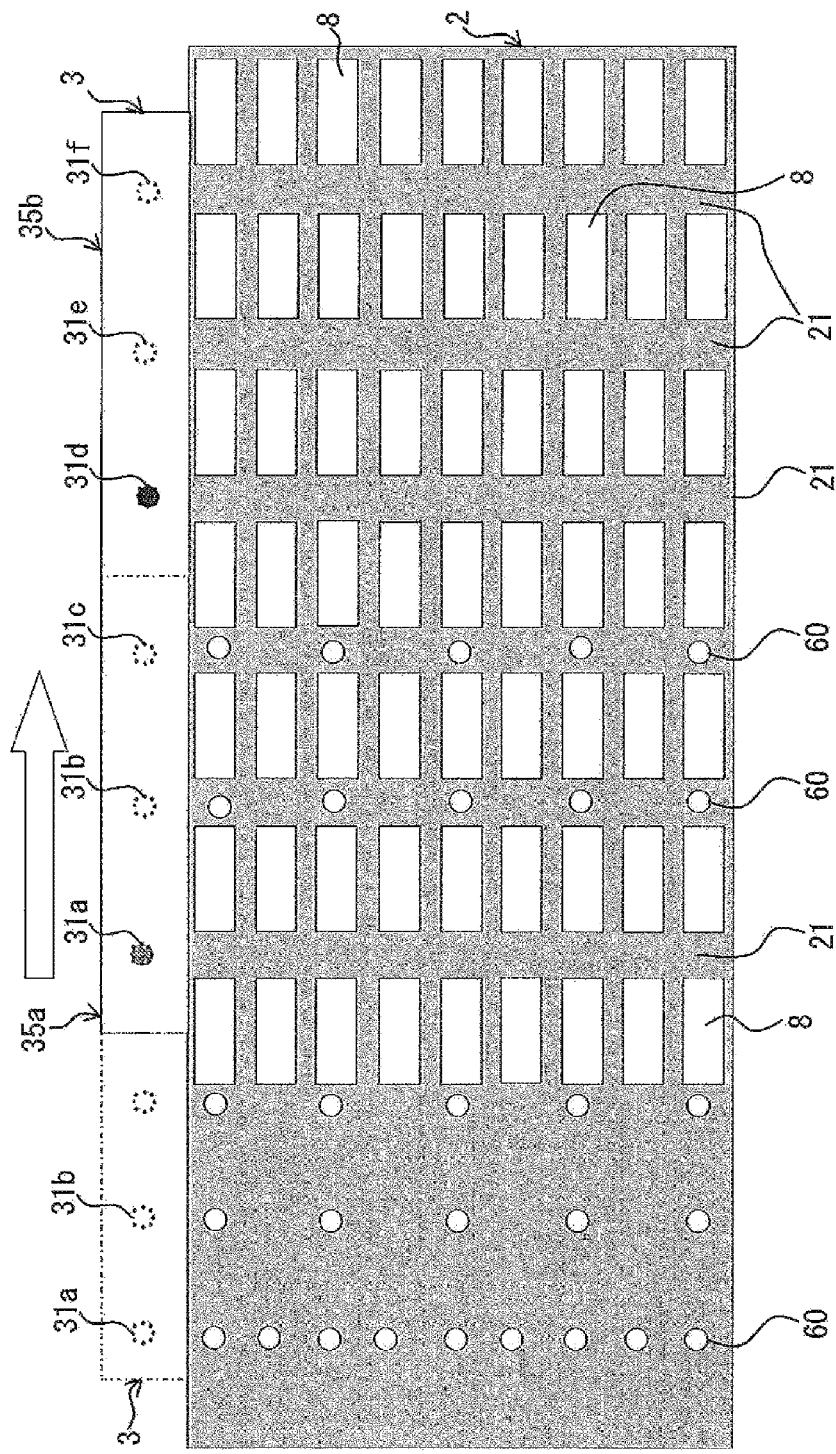
FIG. 4 is an illustrative drawing that shows an align direction moving step of the multi-nozzle mechanism.
Figure 5:
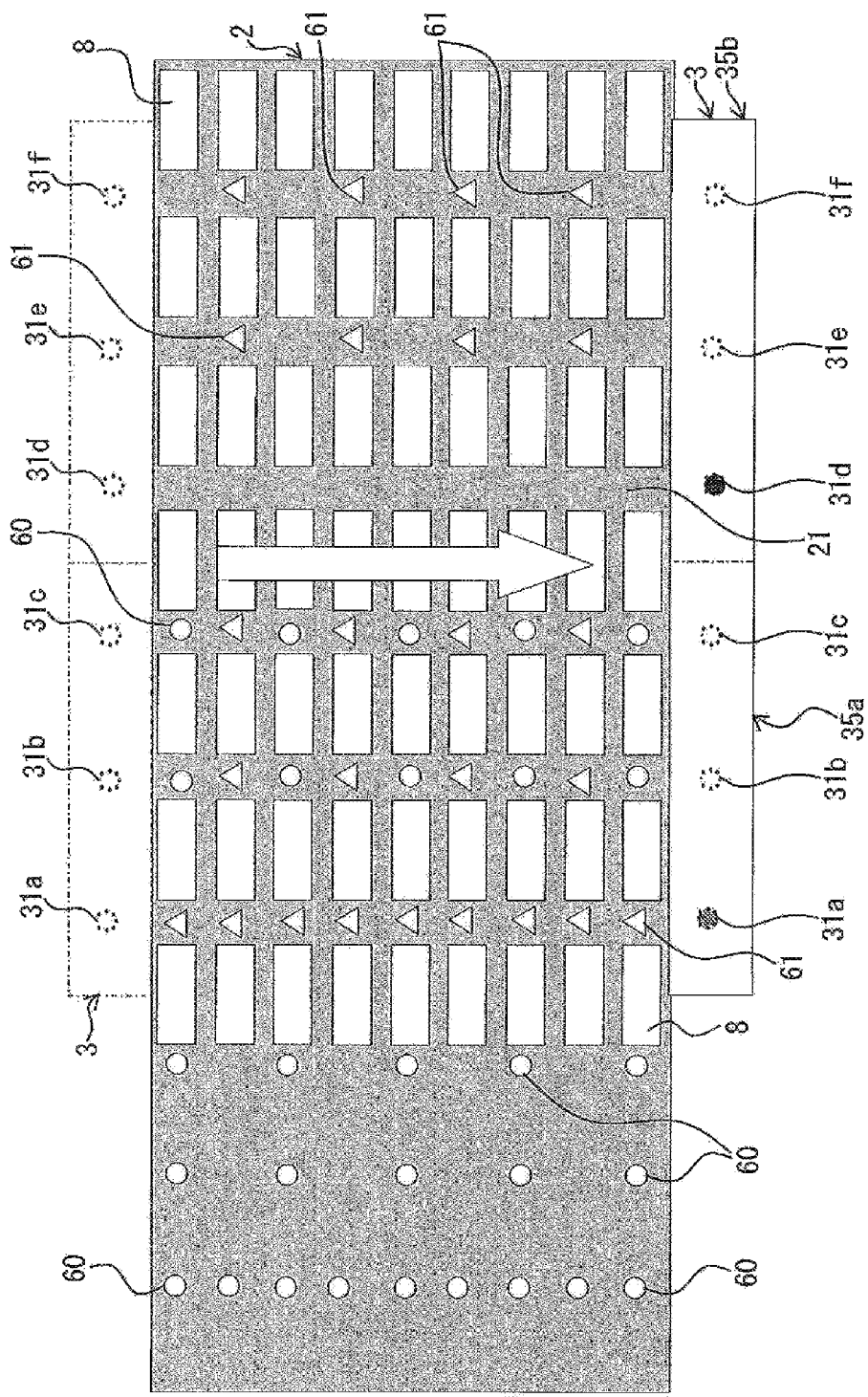
FIG. 5 is an illustrative drawing that shows a backward path step of the multi-nozzle mechanism.

Next, descriptions of an operation of the ejection device 1 and a method of disposing the droplets containing the spacers on the spacer regions 21 of the substrate 2 with the use of the ejection device 1 (a droplet disposition method) will be provided referring to FIGS. 1, 2A, and 2B together with FIGS. 3 to 5. It should be noted that the droplet disposition method can be implemented with the use of the ejection device 1 according to the preferred embodiment of the present invention.

Forward Path Step

FIG. 3 is an illustrative drawing that shows a forward path step of the multi-nozzle mechanism 3. In FIG. 3, the multi-nozzle mechanism 3 that is indicated by the broken lines represents the multi-nozzle mechanism 3 in an initial position. In the initial position, the multi-nozzle mechanism 3 is set such that among the pair of nozzle row units 35a and 35b, only the nozzles 31d, 31e, and 31f of the nozzle row unit 35b face the spacer regions 21 of the substrate 2. It should be noted that RGB color filters 8 are enclosed with the grid pattern black matrix regions in FIG. 3.

In FIG. 3, among the three nozzles 31d, 31e, and 31f of the right nozzle row unit 35b, the left nozzle 31d is the failure nozzle 31d, and among the three nozzle 31a, 31b, and 31c of the right nozzle row unit 35a, the left end nozzle 31a is the nozzle that corresponds to the failure nozzle 31d (the corresponding nozzle 31a). The control mechanism 5 transmits an ejection stop command to the failure nozzle 31d, transmits an cycle change command to the corresponding nozzle 31a, and transmits a forward path ejection command to, among the six nozzle 31, the four nozzles 31b, 31c, 31e, and 31f (normal nozzles) except for the failure nozzle 31d and the corresponding nozzle 31a. In addition, the control mechanism 5 transmits a longitudinal direction move command to the moving mechanism 4 on which the substrate 2 is placed.

When the commands are transmitted from the control mechanism 5 to the nozzles 31 and the moving mechanism 4, the nozzles 31 of the multi-nozzle mechanism 3 are translationally moved in the longitudinal direction at a given speed along the spacer regions 21 on the substrate 2 (the forward path step).

On this occasion, droplets 60 of the spacer dispersion liquid are ejected from the normal nozzles 31b, 31c, 31e, and 31f at a given cycle (T). On the spacer regions 21 through which the normal nozzles 31 have passed, the droplets 60 are disposed at substantially equal intervals. It should be noted that the droplets 60 include a plurality of spacers in general.

No droplets are ejected from the failure nozzle 31d. Therefore, no droplets are disposed on the spacer regions 21 through which the failure nozzle 31d has passed. On this occasion, the droplets are ejected from the corresponding nozzle 31a at a cycle that is half the cycle of the normal nozzles 31b, 31c, 31e, and 31f (T/2). In other words, the number of ejection times of the corresponding nozzle 31a in a given period of time is twice the number of ejection times of the normal nozzles 31b, 31c, 31e, and 31f. On the spacer regions 21 through which the corresponding nozzle 31a has passed, the droplets 60 are disposed at intervals that are substantially half the intervals between the droplets that are disposed after the normal nozzles 31b, 31c, 31e, and 31f have passed through.

Align Direction Moving Step

FIG. 4 is an illustrative drawing that shows an align direction moving step of the multi-nozzle mechanism 3. In FIG. 4, the multi-nozzle mechanism 3 that is indicated by the alternate long and short dash lines represents the multi-nozzle mechanism 3 after the forward path step. After the forward path step, the multi-nozzle mechanism 3 is moved in the align direction of the spacer regions 21 by a length of the nozzle row unit 35 before turning around and entering a backward path step. The movement of the multi-nozzle mechanism 3 in the align direction is based on the align direction move command that is transmitted from the control mechanism 5 to the moving mechanism 4 on which the substrate 2 is placed.

On this occasion, among the pair of nozzle row units 35a and 35b, the right nozzle row unit 35b including the failure nozzle 31d is moved onto the spacer regions 21 on which droplets are not yet disposed, and the left nozzle row unit 31a including the corresponding nozzle 31a is moved onto the spacer regions 21 through which the right nozzle row unit 35b has passed in the forward path step. In other words, the corresponding nozzle 31a faces the spacer regions 21 through which the failure nozzle 31d has passed and no droplets are disposed in the forward path step.

In the align direction moving step, droplet ejection of all of the nozzles 31 may be stopped. Therefore, an ejection suspend command may be transmitted from the control mechanism 5 to all of the nozzles 31 so that ejection of all of the nozzles 31 may be suspended in the align direction moving step.

Backward Path Step

FIG. 5 is an illustrative drawing that shows a backward path step of the multi-nozzle mechanism 3. In FIG. 5, the multi-nozzle mechanism 3 indicated by the alternate long and short dash lines represents the multi-nozzle mechanism 3 after the align direction moving step. When the multi-nozzle mechanism 3 is in this state, the control mechanism 5 transmits a backward path ejection command to the four nozzles 31b, 31c, 31e, and 31f (normal nozzles) except for the failure nozzle 31d and the corresponding nozzle 31a. In addition, the control mechanism 5 transmits an ejection stop command to the failure nozzle 31d and transmits a cycle change command to the corresponding nozzle 31a. In addition, the control mechanism 5 transmits a longitudinal direction move command to the moving mechanism 4 on which the substrate 2 is placed as described above.

When the commands are transmitted from the control mechanism 5 to the nozzles 31 and the moving mechanism 4 as described above, the nozzles 31 of the multi-nozzle mechanism 3 are translationally moved in the backward path step (in the longitudinal direction) at a given speed along the spacer regions 21 on the substrate 2. On this occasion, droplets of the spacer dispersion liquid 61 are ejected from the normal nozzles 31b, 31c, 31e, and 31f at a given cycle (T). It should be noted that the droplets 61 that are disposed in the backward path step are indicated by triangles, and the droplets 60 that are disposed in the forward path step are indicated by circles as shown in FIG. 5 for the purpose of illustration. On the spacer regions 21 through which the normal nozzles 31b, 31c, 31e, and 31f have passed, the droplets 61 are disposed between adjacent droplets 60 that are disposed at equal intervals on the spacer regions 21 in the forward path step. On this occasion, no droplets are ejected from the failure nozzle 31d, and therefore, no droplets are disposed on the spacer regions 21 through which the failure nozzle 31d has passed. The droplets are ejected from the corresponding nozzle 31a at the cycle (T/2) that is half the cycle T of the normal nozzles 31b, 31c, 31e, and 31f (the cycle in the backward path step). In other words, the number of ejection times of the corresponding nozzle 31a in a given period of time is twice the number of ejection times of the normal nozzles 31b, 31c, 31e, and 31f. On the spacer regions 21 through which the corresponding nozzle 31a has passed, the droplets 61 are disposed at intervals that are substantially half the intervals between the droplets 61 that are disposed after the normal nozzles 31b, 31c, 31e, and 31f have passed through.

Even if the multi-nozzle mechanism 3 of the ejection device 1 includes the failure nozzle 31d, it is possible to uniformly dispose the droplets 60, 61 containing the spacers on the substrate 2 with the use of such a multi-nozzle mechanism 3. After the droplets containing the spacers are disposed on the spacer regions of the CF substrate (the black matrix regions), the organic solvent in the droplets is volatilized, and only the spacers are left on the spacer regions.

Figure 6:
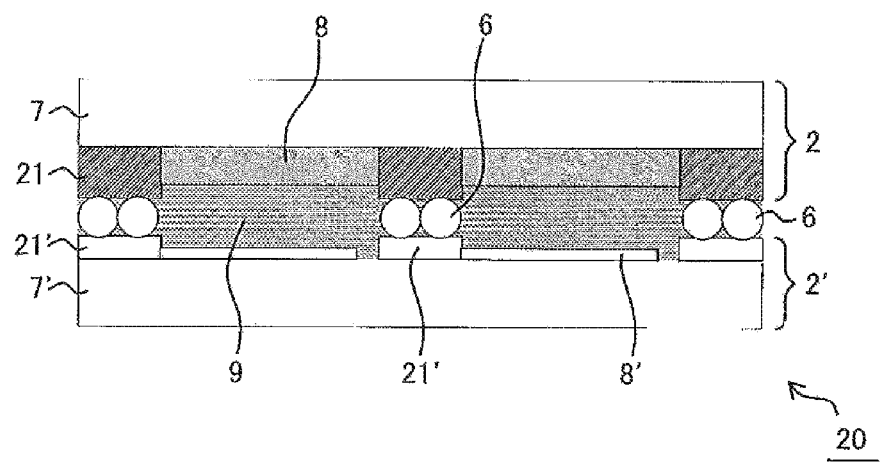
FIG. 6 is an illustrative drawing that shows a configuration of a liquid crystal display panel having a CF substrate with spacers disposed on spacer regions.
Figure 7:
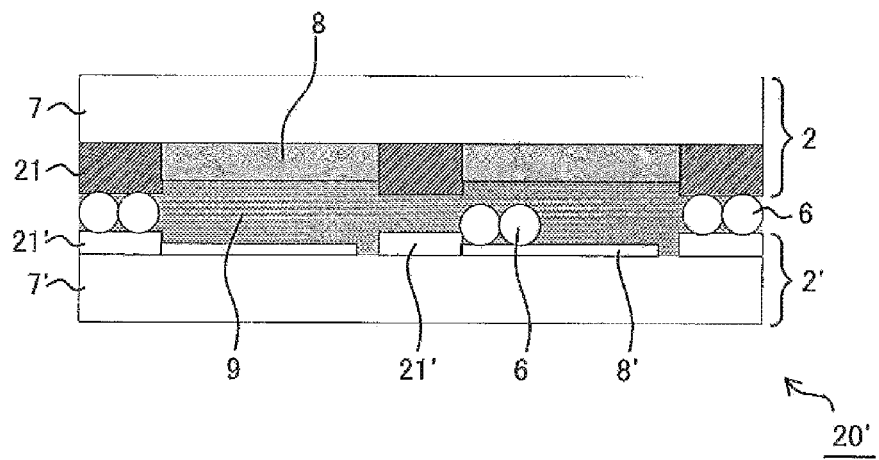
FIG. 7 is an illustrative drawing that shows a configuration of a liquid crystal display panel in which spacers not within spacer regions are interposed between substrates.

FIG. 6 is an illustrative drawing that schematically shows the liquid crystal display panel 20 that uses the CF substrate 2 on which the spacers 6 are disposed with the use of the ejection device 1 according to the preferred embodiment of the present invention. As shown in FIG. 6, the TFT substrate 2' is placed on the CF substrate 2 with the spacers 6 disposed on the black matrix regions 21, and liquid crystals 9 are filled between the substrates 2, 2'. For the purpose of illustration, for the CF substrate 2, only the transparent substrate 7, the matrix regions 21 provided on the transparent substrate 7, and the color filters 8 are shown, and for the TFT substrate 2', only a transparent substrate 7', gate lines 21' provided on the transparent substrate 7', and pixel electrodes 8' are shown. As shown in FIG. 6, the spacers 6 are interposed between the black matrix regions 21 of the CF substrate 2 and the gate lines 21' of the TFT substrate 2'. The interposition of the spacers 6 between the CF substrate 2 and the TFT substrate 2' keeps the gap between the substrates (cell gap) uniform.

In another preferred embodiment of the present invention, the ejection device 1 may be used for dropping a resin liquid that is a material of the color filters 8 (a color filter resin liquid) into each of the regions that are enclosed with the grid pattern black matrix regions of the transparent substrate 7.

The device that ejects the color filter resin liquid is as described below.

An ejection device that disposes droplets of the color filter resin liquid ejecting a color filter resin liquid on pixel regions that are enclosed with grid pattern black matrix regions of a substrate, the ejection device comprising: a multi-nozzle mechanism that comprises a pair of nozzle row units prepared by equally dividing a nozzle row that comprises a plurality of nozzles that are aligned so as to face pixel regions of each row and are arranged to eject the color filter resin liquid; a moving mechanism arranged to relatively move the multi-nozzle mechanism and the substrate in a longitudinal direction of the pixel regions so that the nozzles are translationally moved along the pixel regions and relatively move the multi-nozzle mechanism and the substrate in an align direction of the pixel regions so that the pixel regions that face the nozzles are changed; and a control mechanism arranged to give a command to the moving mechanism to move the multi-nozzle mechanism in the align direction by a length of the nozzle row unit each time the multi-nozzle mechanism turns around when performing forward and backward movements in the longitudinal direction, in a forward path, give a command to the nozzles to eject the color filter resin liquid in a cycle such that the droplets are disposed at given intervals on the pixel regions, and in a backward path, give a command to the nozzles to eject the color filter resin liquid in a cycle that is the same as the cycle in the forward path so that the droplets are disposed between adjacent droplets that are disposed on the pixel regions in the forward path, wherein when one of the pair of nozzle row units includes a failure nozzle, the control mechanism gives a command to the failure nozzle not to eject the color filter resin liquid, and gives a command to a nozzle in the other nozzle row unit in a position that corresponds to a position of the failure nozzle to halve the cycle in the forward path and the cycle in the backward path.

The invention claimed is:

1. An ejection device that ejects a spacer dispersion liquid prepared by dispersing spacers in a solvent, and disposes droplets of the spacer dispersion liquid on spacer regions of a substrate, the ejection device comprising:
   a multi-nozzle mechanism that comprises a pair of nozzle row units prepared by equally dividing a nozzle row that comprises a plurality of nozzles that are aligned so as to face different spacer regions and are configured to eject the spacer dispersion liquid;
   a moving mechanism configured to move the multi-nozzle mechanism with respect to the substrate in a longitudinal direction of the spacer regions so that the nozzles are translationally moved along the spacer regions and move the multi-nozzle mechanism with respect to the substrate in an align direction of the spacer regions so that the spacer regions that face the nozzles are changed; and
   a control mechanism configured to
      give a command to the moving mechanism to move the multi-nozzle mechanism in the align direction by a length of the nozzle row unit each time the multi-nozzle mechanism turns around when performing forward and backward movements in the longitudinal direction,
      in a forward path, give a command to the nozzles to eject the spacer dispersion liquid in a cycle such that the droplets are disposed at given intervals on the spacer regions, and
      in a backward path, give a command to the nozzles to eject the spacer dispersion liquid in a cycle that is the same as the cycle in the forward path so that the droplets are disposed between adjacent droplets that are disposed on the spacer regions in the forward path,
   wherein when one of the pair of nozzle row units includes a failure nozzle, the control mechanism gives a command to the failure nozzle not to eject the spacer dispersion liquid, and gives a command to a nozzle in the other nozzle row unit in a position that corresponds to a position of the failure nozzle to halve the cycle in the forward path and the cycle in the backward path.

2. The ejection device according to claim 1, wherein the substrate comprises a thin film transistor (TFT) substrate, and the spacer regions comprise gate lines.

3. The ejection device according to claim 1, wherein the substrate comprises a color filter (CF) substrate, and the spacer regions comprise black matrix regions.

4. A droplet disposition method for disposing droplets of a spacer dispersion liquid prepared by dispersing spacers in a solvent on spacer regions of a substrate with the use of an ejection device comprising a pair of multi-nozzle mechanisms prepared by equally dividing a nozzle row comprising a plurality of nozzles that are aligned so as to face different spacer regions and are configured to to eject the spacer dispersion liquid, the method comprising:
   a forward path step of moving the multi-nozzle mechanism with respect to the substrate in a longitudinal direction of the spacer regions so that the nozzles are translationally moved along the spacer regions and ejecting the spacer dispersion liquid from the nozzles in a cycle such that the droplets are disposed at given intervals on the spacer regions;
   a backward path step of moving the multi-nozzle mechanism with respect to the substrate in the longitudinal direction of the spacer regions so that the nozzles are translationally moved along the spacer regions and ejecting the spacer dispersion liquid from the nozzles in a cycle that is the same as the cycle in the forward path so that the droplets are disposed between adjacent droplets that are disposed on the spacer regions in the forward path; and
   an align direction moving step of moving the multi-nozzle mechanism with respect to the substrate in the align direction by a length of the nozzle row unit so that the spacer regions that face the nozzles are changed each time the multi-nozzle mechanism turns around, wherein when one of the pair of nozzle row units includes a failure nozzle, the spacer dispersion liquid is not ejected from the failure nozzle in the forward path step and in the backward path step, and the spacer dispersion liquid is ejected from a nozzle in the other nozzle row unit in a position that corresponds to a position of the failure nozzle at a cycle that is half the cycle in the forward path and the cycle in the backward path.

* * * * *